United States Patent
Goto et al.

(10) Patent No.: US 9,481,813 B2
(45) Date of Patent: Nov. 1, 2016

(54) BONDING MATERIAL COMPOSITION, ALUMINUM NITRIDE BONDED BODY, AND METHOD FOR PRODUCING THE SAME

(71) Applicant: NGK Insulators, Ltd., Nagoya (JP)

(72) Inventors: Masashi Goto, Nagoya (JP); Noboru Nishimura, Nagoya (JP); Yuji Katsuda, Tsushima (JP)

(73) Assignee: NGK Insulators, Ltd., Nagoya (JP)

( * ) Notice: Subject to any disclaimer, the term of this patent is extended or adjusted under 35 U.S.C. 154(b) by 80 days.

(21) Appl. No.: 14/561,449

(22) Filed: Dec. 5, 2014

(65) Prior Publication Data

US 2015/0184030 A1    Jul. 2, 2015

(30) Foreign Application Priority Data

Dec. 27, 2013 (JP) .................. 2013-272947
Sep. 17, 2014 (JP) .................. 2014-188416
Sep. 19, 2014 (JP) .................. 2014-191258

(51) Int. Cl.
    *C04B 37/00* (2006.01)
    *C09J 5/00* (2006.01)
    *C09J 1/00* (2006.01)
    *C09J 5/06* (2006.01)

(52) U.S. Cl.
    CPC ............. *C09J 1/00* (2013.01); *C04B 37/005* (2013.01); *C09J 5/06* (2013.01); *C04B 2237/08* (2013.01); *C09J 2400/123* (2013.01); *Y10T 428/31536* (2015.04)

(58) Field of Classification Search
CPC .............. C04B 35/005; C04B 35/006; C04B 2237/08
See application file for complete search history.

(56) References Cited

U.S. PATENT DOCUMENTS

| 5,721,062 A * | 2/1998 | Kobayashi ............ C04B 37/005 |
| | | 428/688 |
| 9,340,462 B2 * | 5/2016 | Harris ............... H01L 21/67103 |
| 2006/0110624 A1 * | 5/2006 | Hattori ................... B32B 18/00 |
| | | 428/698 |

FOREIGN PATENT DOCUMENTS

| JP | 2783980 B2 | 8/1998 |
| JP | 3389484 B2 | 3/2003 |
| JP | 4398288 B2 | 1/2010 |
| JP | 4787568 B2 | 10/2011 |

* cited by examiner

*Primary Examiner* — David M Brunsman
(74) *Attorney, Agent, or Firm* — Burr & Brown, PLLC

(57) ABSTRACT

A first bonding material composition according to the present invention is a bonding material composition used when aluminum nitride sintered bodies containing a rare-earth metal oxide are bonded to each other, in which the bonding immaterial composition contains, in addition, to an O element-containing aluminum nitride raw material, (a) as a fluorine compound, at least one of a fluorine compound of an alkaline-earth metal and a fluorine compound of a rare-earth metal, or (b) as a fluorine compound, at least one of a fluorine compound of an alkaline-earth metal and a fluorine compound of a rare-earth metal, and a rare-earth metal oxide.

12 Claims, 4 Drawing Sheets

BONDING MATERIAL COMPOSITION, ALUMINUM NITRIDE BONDED BODY, AND METHOD FOR PRODUCING THE SAME

BACKGROUND OF THE INVENTION

1. Field of the Invention

The present invention relates to a bonding material composition, an aluminum nitride bonded body, and a method for producing the same.

2. Description of the Related Art

Various method for bonding aluminum nitride sintered bodies have been known. For example, PTL 1 discloses a bonding method in which a solution of a sintering aid, such as an yttrium compound, is applied between aluminum nitride sintered bodies, and the aluminum nitride sintered bodies are heated to a bonding temperature of 1850° C. or higher to allow aluminum nitride grains at a bonding interface to grow. PTL 2 discloses a bonding method in which a bonding material composition containing aluminum nitride and a rare-earth oxide is applied between aluminum nitride sintered bodies, and the aluminum nitride sintered bodies are heated to a bonding temperature of 1700° C. to 2000° C. to sinter the bonding material composition. PTL 3 discloses a bonding method in which a flux containing calcium aluminum oxide and an oxide of a rare-earth element and aluminum nitride are applied between aluminum nitride sintered bodies, and the aluminum nitride sintered bodies are heated to a bonding temperature of 1450° C. to melt the flux. PTL 4 discloses a bonding method in which a fused body of aluminum chloride and urea is applied between aluminum nitride sintered bodies, and the aluminum nitride sintered bodies are heated to a bonding temperature of 700° C. to 1500° C. to form aluminum nitride.

CITATION LIST

Patent Literature

PTL 1: Japanese Patent No. 2783980
PTL 2: Japanese Patent No. 3389484
PTL 3: Japanese Patent No. 4787568
PTL 4: Japanese Patent No. 4398288

SUMMARY OF THE INVENTION

In the methods disclosed in PTLs 1 and 2, however, heating is performed to 1850° C. or higher or 1700° C. or higher, which is the sintering temperature region (high-temperature region) of aluminum nitride, so that the aluminum nitride sintered bodies are deformed, in some cases. Moreover, in products, such as heaters and electrostatic chucks for use in semiconductor production equipment and so forth, conductive materials serving as heater electrodes and electrostatic-chuck electrodes are embedded in aluminum nitride. When these materials are exposed to such high bending temperatures, the electrode material characteristics, such as electrical conductivity, are changed by alteration or an excessive reaction with a surrounding component, in some cases. This affects the characteristics, such as the heating performance of heaters and the adsorptive power of electrostatic chucks, to cause particular problems of non-uniform characteristics. In the method disclosed in PTL 3, a bonded body is produced at 1450° C., which is a relatively low temperature. However, the calcium oxide component contained in the bonding material composition has low water resistance. Thus, there is a problem in which it is difficult to stably use the resulting bonded body without a change in characteristics over a long period of time. In the method disclosed in PTL 4, the bonded body is produced at 700° C. to 1500° C., which is a relatively low temperature. However, vaporized ammonium chloride is generated in the course of the reaction between urea and aluminum chloride. This may cause difficulty in applying the method to industry.

The present invention has been accomplished to solve the foregoing problems. It is a main object of the present invention to satisfactorily and stably perform the bonding of aluminum nitride sintered bodies to each other at a relatively low temperature without the generation of a troublesome gas.

A bonding material composition according to the present invention is a bonding material composition used when aluminum nitride sintered bodies containing a rare-earth metal oxide are bonded to each other, in which the bonding material composition contains, in addition to an O element-containing aluminum nitride raw material, (a) as a fluorine compound, at least one of a fluorine compound of an alkaline-earth metal and a fluorine compound of a rare-earth metal, or (b) as a fluorine compound, at least one of a fluorine compound of an alkaline-earth metal and a fluorine compound of a rare-earth metal, and a rare-earth metal oxide (hereinafter, the bonding material composition is referred to as a "first bonding material composition").

A bonding material composition according to the present invention is a bonding material composition used when an aluminum nitride sintered body free from a rare-earth metal oxide is bonded to an aluminum nitride sintered body that contains or does not contain a rare-earth metal oxide, in which the bonding material composition contains, in addition to an O element-containing aluminum nitride raw material, (a) at least one of a fluorine compound of an alkaline-earth metal and a fluorine compound of a rare-earth metal, and a rare-earth metal oxide, (b) a fluorine compound of a rare-earth metal, or (c) a fluorine compound of an alkaline-earth metal and a fluorine compound of a rare-earth metal (hereinafter, the bonding material composition is referred to as a "second bonding material composition").

An aluminum nitride bonded body according to the present invention is an aluminum nitride bonded body in which aluminum nitride sintered bodies are bonded to each other with a holding layer, in which the bonding layer contains, as a crystal phase, AlN and at least one of a fluorine compound of an alkaline-earth metal and a fluorine compound of a rare-earth metal. From a different perspective, the aluminum nitride bonded body according to the present invention is an aluminum nitride bonded body in which aluminum nitride sintered bodies are bonded to each other with a bonding layer, in which the aluminum nitride sintered bodies have reaction layers at interfaces with the bonding layer, the reaction layers being formed by the reaction of an oxide contained in the aluminum nitride sintered bodies and a fluorine compound contained in the bonding material composition before the formation of the bonding layer.

A method for producing an aluminum nitride bonded body according to the present invention includes sandwiching the foregoing bonding material composition between aluminum nitride sintered bodies, and heating the resulting assembly at 1450° C. or lower with a bonding load applied, thereby producing an aluminum nitride bonded body in which the aluminum nitride sintered bodies are bonded to each other.

According to the present invention, it is possible to satisfactorily and stably perform the bonding of the aluminum nitride sintered foodies to each other at a relatively low temperature without the generation of a troublesome gas. For example, an assembly in which the first bonding material composition according to the present invention is sandwiched between aluminum nitride sintered bodies containing rare-earth metal oxide is fired at a relatively low temperature (for example, 1350° C., 1400° C., or 1450° C.) with a bonding load applied, thereby producing an aluminum nitride bonded body in a satisfactory bending state. Furthermore, an assembly in which the second bonding material composition according to the present invention is sandwiched between an aluminum nitride sintered body free from a rare-earth metal oxide and an aluminum nitride sintered body that may contain a rare-earth metal oxide is fired at a relatively low temperature with a bonding load applied, thereby producing an aluminum nitride bonded body in a satisfactory bonding state.

A mechanism for establishing the satisfactory bonding of the aluminum nitride sintered bodies with the bonding material composition according to the present invention by firing at a relatively low temperature is speculated as follows: That is, in the case where the aluminum nitride sintered bodies containing the rare-earth metal oxide are bonded to each other, when the assembly in which the first bonding material composition according to the present invention is sandwiched therebetween is heated at a relatively low temperature with a bonding load applied, a liquid phase mainly containing a fluorine compound is seemingly formed in the first bonding material composition. The liquid phase seemingly diffuses in the aluminum nitride sintered bodies and reacts with an oxide in the aluminum nitride sintered bodies to form a new liquid phase. The newly formed liquid phase seemingly contains a rare-earth metal element, Al element, O element, and F element. Of these, the rare-earth metal element is one contained in the aluminum nitride sintered bodies. Part of the liquid phase seemingly diffuses in the bonding material composition. AlN in the bonding material composition is seemingly sintered at a relatively low temperature in the presence of the liquid phase to bond the aluminum nitride sintered bodies together at satisfactory bonding strength. In the case where the aluminum nitride sintered bodies free from a rare-earth metal oxide are bonded to each other, when an assembly in which the second bonding material composition according to the present invention is sandwiched therebetween is heated at a relatively low temperature with a bonding load applied, the reaction of a component in the second bonding material composition occurs seemingly, thereby forming a liquid phase. The liquid phase seemingly contains a rare-earth metal element, Al element, O element, and F element. AlN in the bonding material composition is seemingly sintered at a relatively low temperature in the presence of the liquid phase to bond the aluminum nitride sintered bodies together at satisfactory bending strength. Even in the case where one is the aluminum nitride sintered body containing the rare-earth metal oxide and where the other is the aluminum nitride sintered body free from a rare-earth metal oxide, similarly, a liquid phase containing a rare-earth metal element, Al element, O element, and F element is formed to bond the sintered bodies together. In any case, since the bonding temperature is low, the aluminum nitride sintered bodies before bonding are not deformed by heat. Furthermore, no troublesome gas, such as ammonium chloride, is generated.

DESCRIPTION OF THE PREFERRED EMBODIMENTS

Figure 1:
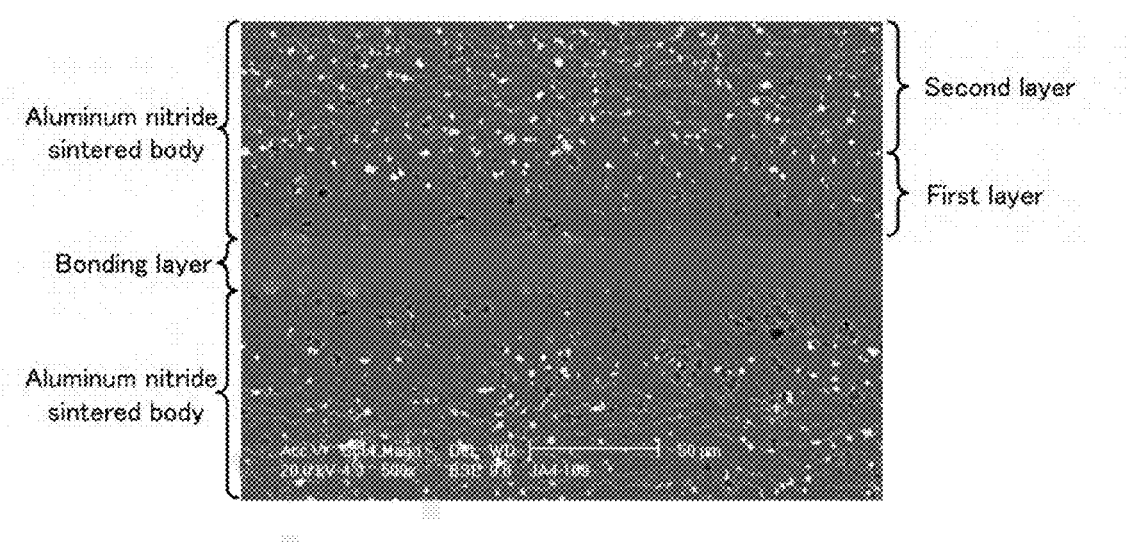
FIG. 1 is a photograph of a microstructure in experimental example 1.

A bonding material composition according to the present invention is a first bonding material composition, that is, is a bonding material composition used when aluminum nitride sintered bodies containing a rare-earth metal oxide are bonded to each other, in which the bonding material composition contains, in addition to an O element-containing aluminum nitride raw material, (a) as a fluorine compound, at least one of a fluorine compound of an alkaline-earth metal and a fluorine compound of a rare-earth metal, or (b) as a fluorine compound, at least one of a fluorine compound of an alkaline-earth metal and a fluorine compound of a rare-earth metal, and a rare-earth metal oxide; or is a second bonding material composition, that is, a bonding material composition used when an aluminum nitride sintered body free from a rare-earth metal oxide is bonded to an aluminum nitride sintered body that may contain a rare-earth metal oxide, in which the bonding material composition contains, in addition to an O element-containing aluminum nitride raw material, (a) at least one of a fluorine compound of an alkaline-earth metal and a fluorine compound of a rare-earth metal, and a rare-earth metal oxide, (b) a fluorine compound of a rare-earth metal, or (c) a fluorine compound of an alkaline-earth metal and a fluorine compound of a rare-earth metal.

Here, the aluminum nitride sintered body containing the rare-earth metal oxide is produced by, for example, adding a rare-earth metal oxide serving as a sintering aid to an aluminum nitride powder, mixing the resulting mixture, adding a binder to the powder mixture, performing granulation, forming the resulting granulated powder into a desired shape, and firing the resulting compact by a hot pressing method. Examples of the rare-earth metal oxide include $Y_2O_3$, $La_2O_3$, $CeO_2$, $Nd_2O_3$, $Sm_2O_3$, $Eu_2O_3$, $Gd_2O_3$, $Dy_2O_3$, $Ho_2O_3$, $Tm_2O_3$, $Y_2O_3$, and $Lu_2O_3$. Of these, $Y_2O_3$ and $Yb_2O_3$ are preferred. The content of the rare-earth metal oxide in the powder mixture is preferably 0.1% to 10% by mass in the form of $RE_2O_3$ (RE represents a rare-earth metal element). Examples of the binder include organic binders, such as polyvinyl butyral and polyvinyl acetal. In the hot pressing method, firing is performed under pressure in an inert atmosphere, for example, a vacuum atmosphere, a nitrogen gas atmosphere, or an argon gas atmosphere. Regarding the pressure conditions, the pressure is preferably 100 to 400 kgf/cm² and more preferably 150 to 300 kgf/cm². The firing temperature is preferably 1700° C. to 2000° C. and more preferably 1750° C. to 1900° C. However, the firing may be performed at normal pressure in place of the hot pressing method.

The aluminum nitride sintered body free from a rare-earth metal oxide is produced by, for example, adding a binder to an aluminum nitride powder, performing granulation, forming the resulting granulated powder into a desired shape, and firing the resulting compact by a hot pressing method. Examples of the binder include organic binders, such as polyvinyl butyral and polyvinyl acetal. In the hot pressing method, firing is performed under pressure in an inert atmosphere, for example, a vacuum atmosphere, a nitrogen gas atmosphere, or an argon gas atmosphere. Regarding the pressure conditions, the pressure is preferably 100 to 400 kgf/cm$^2$ and more preferably 150 to 300 kgf/cm$^2$. The firing temperature is preferably 1700° C. to 2000° C. and more preferably 1800° C. to 1900° C. When the granulated powder is prepared, granulation may be performed after a sintering aid (for example, magnesium oxide or calcium oxide) is added in place of or in addition to the binder.

The aluminum nitride raw material in the bonding material composition is preferably in a powder form. Even when the aluminum nitride raw material is highly pure, its surface is oxidized, and thus the aluminum nitride raw material inevitably contains O element. The content of O element in the aluminum nitride raw material may be, but not particularly limited to, for example, 0.4% to 30% by mass. In this range, the advantages of the present invention are sufficiently provided. The content of O element may be adjusted as follows: the degree of oxidation of the raw material powder is controlled by controlling the heating conditions (heating temperature and heating time) at the time of heating the aluminum nitride raw material powder with an air furnace or the aluminum nitride raw material powder is pulverized to control the surface area of the powder. Both the pulverization and the oxidation by heating may be performed. The heating temperature may be appropriately set in the range of, for example, 600° C to 900° C. The heating time may be appropriately set in the range of, for example, 0.5 to 10 hours. The pulverization time may be appropriately set in the range of, for example, 2 to 50 hours. Regarding the contents of aluminum nitride and the fluorine compound in the bonding material composition, aluminum nitride is preferably contained in an amount of 20% to 85% by mass (excluding the oxygen content in terms of aluminum oxide), and the fluorine compound is preferably contained in an amount of 10% to 50% by mass. In these ranges, the advantages of the present invention are sufficiently provided.

As the fluorine compound of the alkaline-earth metal, a compound containing an alkaline-earth metal element and fluorine element may be used. An alkaline-earth metal fluoride is preferred. Preferred examples of the alkaline-earth metal fluoride include $MgF_2$, $CaF_2$, $SrF_2$, and $BaF_2$. In particular, $MgF_2$ is preferred. As the fluorine compound of the rare-earth metal, a compound containing a rare-earth metal element and fluorine element may be used. A rare-earth metal fluoride is preferred. Preferred examples of the rare-earth metal fluoride include $YF_3$, $LaF_3$, $CeF_3$, $NdF_3$, $TbF_3$, $YbF_3$, and $LuF_3$. In particular, $YF_3$ and $YbF_3$ are preferred.

The bonding material composition according to the present invention may have an aluminum oxide content of 0.4% to 60% by mass, including a value obtained by calculating the content of O element in the aluminum nitride raw material in terms of $Al_2O_3$, with respect to the entire bonding material composition. In this numerical range, a sufficient amount of a liquid phase is formed, so the sintering of aluminum nitride in the bonding material composition proceeds to provide a bonded body having sufficient bonding strength, which is preferred. The aluminum oxide-containing bonding material composition, may further contain a rare-earth metal oxide in an amount of 40% to 150% by mass with respect to the aluminum oxide content (including a value obtained by calculating the content of O element in the aluminum nitride raw material in terms of aluminum oxide). In this numerical range, a sufficient amount of a liquid phase is formed, so the sintering of aluminum nitride in the bonding material composition proceeds to provide a bonded body having sufficient bonding strength, which is preferred. Note that the rare-earth metal oxide and aluminum oxide may be contained as precursor substances to be formed into oxides in the course of the bonding process.

The aluminum nitride bonded body according to the present invention is an aluminum nitride bonded body in which aluminum nitride sintered bodies are bonded to each other with a bonding layer, in which the bonding layer contains, as a crystal phase, AlN and at least one of a fluorine compound of an alkaline-earth metal and a fluorine compound of a rare-earth metal. From a different perspective, the aluminum nitride bonded body according to the present invention is an aluminum nitride bonded body in which aluminum nitride sintered bodies are bonded to each other with a bonding layer, in which the aluminum nitride sintered bodies have reaction layers at interfaces with the bonding layer, the reaction layers being formed by the reaction of an oxide contained in the aluminum nitride sintered bodies and a fluorine compound contained in the bonding material composition before the formation of the bonding layer. The bonded body is produced by sandwiching the first bonding material composition according to the present invention between the aluminum nitride sintered bodies containing rare-earth metal oxide and firing the resulting assembly at a relatively low temperature (for example, 1350° C., 1400° C., or 1450° C.) with a bonding load applied. Alternatively, the bonded body is produced by sandwiching the second bonding material composition according to the present invention between the aluminum nitride sintered body free from a rare-earth metal oxide and the aluminum nitride sintered body that may contain the rare-earth metal oxide and firing the resulting assembly at a relatively low temperature (for example, 1350° C., 1400° C., or 1450° C.) with a bonding load applied.

In the aluminum nitride bonded body according to the present invention, the fluorine compound of the alkaline-earth metal may be an alkaline-earth metal oxyfluoride. The fluorine compound of the rare-earth metal may be a rare-earth metal oxyfluoride. Preferred examples of the rare-earth metal oxyfluoride include YOF, LaOF, CeOF, NdOF, TbOF, YbOF, and LuOF. In particular, YOF and YbGF are preferred.

In the aluminum nitride bonded body according to the present invention, the bonding layer may contain, as a crystal phase, at least one of an alkaline-earth metal-aluminum oxide and a rare-earth metal-aluminum oxide. As the alkaline-earth metal-aluminum oxide, $MgAl_2O_4$ is preferred.

The aluminum nitride bonded body according to the present invention preferably has a bonding strength of 200 MPa or more. In this case, the aluminum nitride bonded body may be used for various members for use in semiconductor production equipment. Examples of the members for use in semiconductor production equipment include electrostatic chucks, susceptors, heaters, plates, inner-wall materials, monitoring windows, microwave-introducing windows, and microwave coupling antennas, which are used for semiconductor production equipment.

A method for producing an aluminum nitride bonded body according to the present invention includes sandwiching the foregoing bonding material composition between aluminum nitride sintered bodies containing the rare-earth metal oxide and heating the resulting assembly at 1450° C. or lower with a bonding load applied, thereby producing an aluminum nitride bonded body in which the aluminum nitride sintered bodies are bonded to each other. For example, (1) an assembly in which the first bonding material composition according to the present invention is sandwiched between aluminum nitride sintered bodies containing rare-earth metal oxide is fired at a relatively low temperature of 1450° C. or lower (for example, 1350° C., 1400° C., or 1450° C.) with a bonding load applied, or (2) an assembly in which the second bonding material composition according to the present invention is sandwiched between an aluminum nitride sintered body free from a rare-earth metal oxide and an aluminum nitride sintered body that may contain a rare-earth metal oxides is fired at a relatively low temperature of 1450° C. or lower (for example, 1350° C., 1400° C., or 1450° C.) with a bonding load applied, thereby producing an aluminum nitride bonded body in which the aluminum nitride sintered bodies are bonded to each other.

Here, the bonding load is preferably 100 kgf/cm$^2$ or lower and more preferably 10 to 70 kgf/cm$^2$. The temperature is preferably 1450° C. or lower and more preferably 1350° C. to 1450° C. The aluminum nitride bonded body produced under the conditions has sufficient bonding strength. Furthermore, the aluminum nitride sintered bodies are not thermally deformed before and after the bonding, so the original shape is maintained. In addition, no troublesome gas, such as ammonium chloride, is generated.

EXAMPLES

Experimental Examples 1 to 11

(Aluminum Nitride Sintered Body)

Five parts by mass of yttrium oxide serving as a sintering aid was added to 100 parts by mass of a commercially available aluminum nitride powder having a purity of 93% or more (excluding the oxygen content). The mixture was mixed using a ball mill. A binder was added to the resulting powder mixture. Granulation was performed by a spray granulation method. The resulting granulated powder was formed into plate-like compacts by metal molding. The resulting plate-like compacts were fired at 1850° C. for 4 hours in nitrogen gas by a hot-pressing method with a pressure applied, thereby producing aluminum nitride sintered bodies. Test pieces, having a size of 50 mm in diameter×10 mm in thickness, of the aluminum nitride sintered bodies were cut out from the resulting aluminum nitride sintered bodies. The bonding surfaces were finished to have a surface roughness (Ra) of 1 μm or less. The units of the purity are % by mass and are simply indicated, by %, for convenience.

(Bonding Material Composition)

As aluminum nitride raw materials, raw material Nos. 1 to 4 described in Table 1 were prepared. As raw material No. 1, a commercially available aluminum nitride powder (particle diameter: 0.8 μm, oxygen content: 4.8% by mass) was used. As raw material No. 2, a commercially available aluminum nitride powder (particle diameter: 1.2 μm, oxygen content: 0.8% by mass) was used. As raw material No. 3, a material obtained by pulverizing the aluminum nitride powder used as raw material No. 2 with a ball mill (particle diameter: 0.7 μm, oxygen content: 3.9% by mass) was used. As raw material No. 4, a material obtained by heating the aluminum nitride powder used as raw material No. 3 at 850° C. for 2 hours in an air furnace was used. The amounts of oxygen in the aluminum nitride raw materials were measured by inert gas fusion-infrared absorbing method. The aluminum nitride raw materials and either commercially available magnesium fluoride (purity: 99.9% or more) or commercially available yttrium fluoride (purity: 99.9% or more) were weighed in such a manner that values (% by mass) indicated in the section "Amount of bonding material composition fed" of experimental examples 1 to 11 described in Tables 2 and 3 were achieved. The weighed materials were mixed together using an alumina mortar to provide bonding material compositions (powder mixtures). Note that values of "Equivalent amount of bonding material composition (% by mass)" in Tables 2 and 3 are values obtained by calculation when it is assumed that all O element in the aluminum nitride raw materials are present in the form of $Al_2O_3$.

TABLE 1

| AlN raw material No. | 1 | 2 | 3 | 4 |
|---|---|---|---|---|
| Amount of oxygen(% by mass) | 4.8 | 0.8 | 3.9 | 5.0 |
| Particle diameter(μm) | 0.8 | 1.2 | 0.7 | 0.7 |

TABLE 2

| | | Experimental example | | | | |
|---|---|---|---|---|---|---|
| | | 1 | 2 | 3 | 4 | 5 |
| Amount of bonding material composition fed (% by mass) | AlN raw material (No. | 70 1 | 50 1 | 70 1 | 80 1 | 90 1) |
| | MgF$_2$ raw material | 30 | 50 | 30 | 20 | 10 |
| | Y$_2$O$_3$ raw material | 0 | 0 | 0 | 0 | 0 |
| | YF$_3$ raw material | 0 | 0 | 0 | 0 | 0 |
| | Al$_2$O$_3$ raw material | 0 | 0 | 0 | 0 | 0 |
| Equivalent Amount of bonding material composition (% by mass) | Amount of AlN | 62.9 | 44.9 | 62.9 | 71.8 | 80.8 |
| | Amount of MgF$_2$ | 30 | 50 | 30 | 20 | 10 |
| | Amount of YF$_3$ | 0 | 0 | 0 | 0 | 0 |
| | Amount of Al$_2$O$_3$ | 7.1 | 5.1 | 7.1 | 8.2 | 9.2 |
| | Amount of Y$_2$O$_3$ with respect to amount of Al$_2$O$_3$ | 0 | 0 | 0 | 0 | 0 |
| Bonding condition | Temperature(° C.) | 1400 | 1400 | 1400 | 1400 | 1400 |
| | Bonding load (kgf/cm$^2$) | 40 | 20 | 20 | 20 | 20 |

TABLE 2-continued

|  |  | Experimental example | | | | |
|---|---|---|---|---|---|---|
|  |  | 1 | 2 | 3 | 4 | 5 |
| Bonding layer | Strength(MPa) | 310 | 250 | 240 | 210 | 230 |
|  | Crystal phase | AlN MgAl$_2$O$_4$ YOF | AlN MgAl$_2$O$_4$ YOF | AlN MgAl$_2$O$_4$ YOF | AlN MgAl$_2$O$_4$ YOF | AlN MgAl$_2$O$_4$ YOF |
| Reaction layer | Crystal phase | AlN MgAl$_2$O$_4$ YOF | AlN MgAl$_2$O$_4$ YOF | AlN MgAl$_2$O$_4$ YOF | AlN MgAl$_2$O$_4$ YOF | AlN MgAl$_2$O$_4$ YOF |

TABLE 3

|  |  | Experimental example | | | | | |
|---|---|---|---|---|---|---|---|
|  |  | 6 | 7 | 8 | 9 | 10 | 11 |
| Amount of bonding material composition fed (% by mass) | AlN raw material (No. | 70 2 | 70 3 | 68 3 | 70 4 | 70 1 | 70 1) |
|  | MgF$_2$ raw material | 30 | 30 | 30 | 30 | 0 | 30 |
|  | Y$_2$O$_3$ raw material | 0 | 0 | 0 | 0 | 0 | 0 |
|  | YF$_3$ raw material | 0 | 0 | 0 | 0 | 30 | 0 |
|  | Al$_2$O$_3$ raw material | 0 | 0 | 2 | 0 | 0 | 0 |
| Equivalent Amount of bonding material composition (% by mass) | Amount of AlN | 68.8 | 64.2 | 62.4 | 62.6 | 62.9 | 62.9 |
|  | Amount of MgF$_2$ | 30 | 30 | 30 | 30 | 0 | 30 |
|  | Amount of YF$_3$ | 0 | 0 | 0 | 0 | 30 | 0 |
|  | Amount of Al$_2$O$_3$ | 1.2 | 5.8 | 7.6 | 7.4 | 7.1 | 7.1 |
|  | Amount of Y$_2$O$_3$ with respect to amount of Al$_2$O$_3$ | 0 | 0 | 0 | 0 | 0 | 0 |
| Bonding condition | Temperature(° C.) | 1400 | 1400 | 1400 | 1400 | 1400 | 1200 |
|  | Bonding load (kgf/cm$^2$) | 20 | 20 | 20 | 20 | 40 | 20 |
| Bonding layer | Strength(MPa) | 200 | 220 | 240 | 250 | 340 | Bonding was failed |
|  | Crystal phase | AlN MgAl$_2$O$_4$ YOF | AlN MgAl$_2$O$_4$ YOF | AlN MgAl$_2$O$_4$ YOF | AlN MgAl$_2$O$_4$ YOF | AlN YOF | Not formed |
| Reaction layer | Crystal phase | AlN MgAl$_2$O$_4$ YOF | AlN MgAl$_2$O$_4$ YOF | AlN MgAl$_2$O$_4$ YOF | AlN MgAl$_2$O$_4$ YOF | AlN YOF | Not formed |

(Bonding Material Paste)

A 45% by mass solution of S-LEC AS (manufacture by Sekisui Chemical Co., Ltd.) in terpineol was added as a binder in a mass ratio of 30% with respect to each bonding material composition. The resulting mixtures were mixed using an alumina mortar to prepare bonding material pastes.

(Bonding)

Each of the bonding material pastes was applied by screen printing to a side of the bonding surfaces of each of the test pieces of the aluminum nitride sintered bodies and dried to evaporate a solvent in the bonding material paste, thereby fixing the bonding material composition on the test piece. The amount of the bonding material paste applied to the aluminum nitride sintered body was 5 to 15 mg/cm$^2$ after drying. The bonding surfaces of the aluminum nitride sintered bodies were bonded to each other. The bonded sample was held at a bonding temperature (maximum temperature) of 1400° C. for 2 hours in nitrogen gas. The rate of temperature increase was 10° C./min. Nitrogen gas was introduced from 900° C. In addition, a pressure was applied so as to press the aluminum nitride sintered bodies against each other in the direction perpendicular to the bonding surfaces. The pressurization was initiated at a pressure of 40 kgf/cm$^2$ or 20 kgf/cm$^2$ from room temperature, continued during holding the sample at a bonding temperature of 1400° C., and terminated when the sample was cooled to room temperature. In this way, the aluminum nitride bonded bodies were produced.

(Evaluation Item)

The bonding strength, the microstructures, and the crystal phases of the bonding layers of the resulting aluminum nitride bonded bodies were evaluated.

Bonding Strength

Regarding the bonding strength, four-point bending strength was measured at room temperature according to JIS 1601. Bending bars were produced by cutting the aluminum nitride bonded bodies into pieces each having a length of about 20 mm (half size of the standard regulation) in such a manner that a bonding interface was located at the center. Tables 2 and 3 describe the bonding strength in experimental examples 1 to 11. The number of the bars used for the bonding strength measurement was 4 to 8, and the average value thereof was described.

Microstructure

Figure 2:
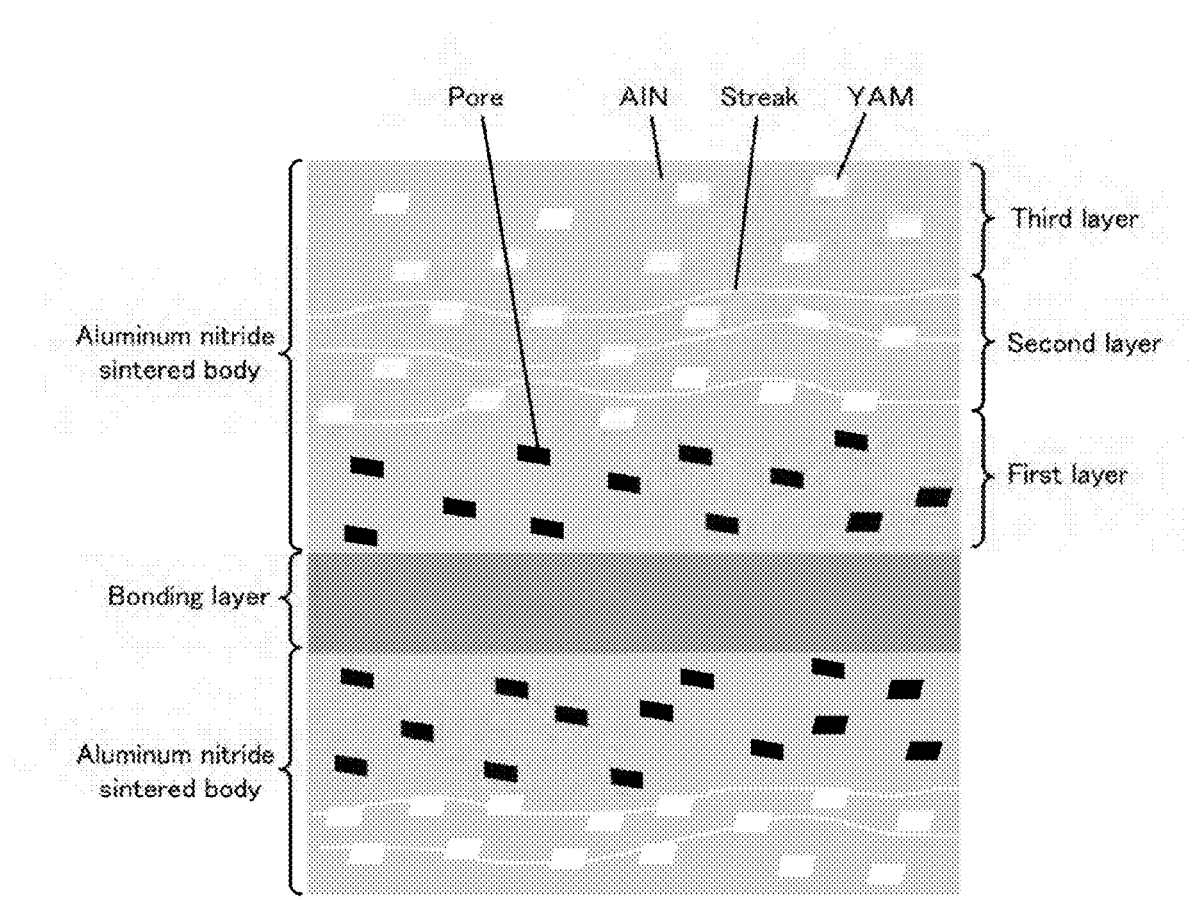
FIG. 2 is a schematic view illustrating a microstructure in experimental example 1.
Figure 3:
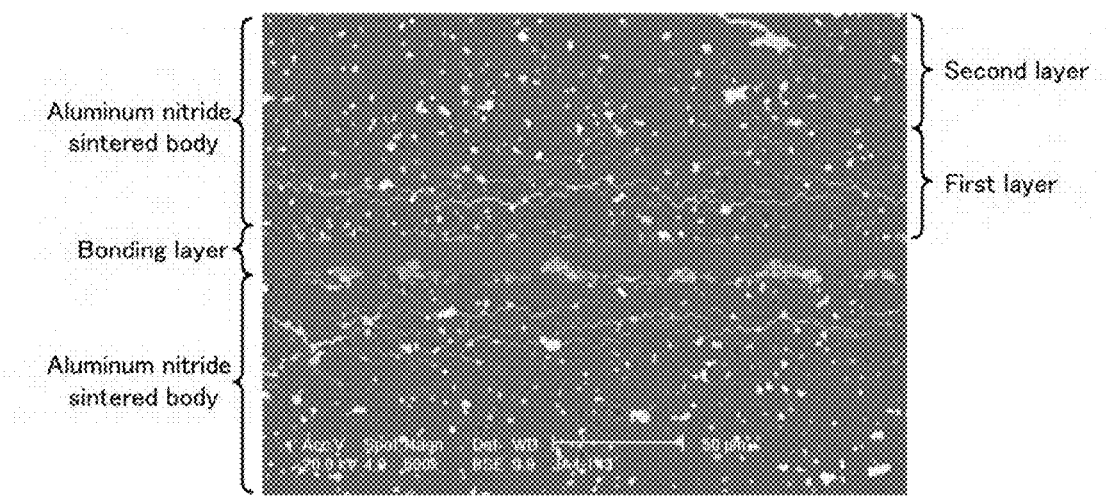
FIG. 3 is a photograph of a microstructure in experimental example 10.

The microstructure was evaluated on the basis of a photograph of the microstructure of each of the resulting aluminum nitride bonded bodies. Specifically, a surface including the bonding layer was polished and observed with a scanning electron microscope (SEM). The SEM observation was performed with XL30 manufacture by Philips at an acceleration voltage of 20 kV and a spot size of 4.0. As typical examples, a photograph of a microstructure in experimental example 1 is illustrated in FIG. 1, a schematic view thereof is illustrated in FIG. 2, and a photograph of a microstructure in experimental example 10 is illustrated in FIG. 3.

Crystal Phase of Bonding Layer

The crystal phases of the bonding layers were measured by micro-area X-ray diffraction. As a measuring apparatus, D8 DISCOVER μHR Hybrid manufactured by Bruker AXS was used. The crystal phases of the bonding layers in experimental examples 1 to 11 are described in Tables 2 and 3.

Crystal Phase of Reaction Layer

The crystal phases of the reaction layers were measured in the same way as the crystal phases of the bending layers. The crystal phases of the reaction layers in experimental examples 1 to 11 are described in Tables 2 and 3.

(Evaluation Result)

In each of experimental examples 1 to 5, a bonding material composition containing aluminum nitride raw material No. 1 (oxygen content: 4.8% by mass) and a $MgF_2$ raw material was prepared, the content of the $MgF_2$ raw material being 10% to 50% by mass. The aluminum nitride sintered bodies were bonded to each other with the bonding material composition. All the resulting aluminum nitride bonded bodies had a high bonding strength of 200 MPa or more. No troublesome gas was generated. The aluminum nitride sintered bodies were not deformed before and after the bonding, and the original shape was maintained. The crystal phases of each of the bonding layers were AlN, $MgAl_2O_4$, and YOF. O element in $MgAl_2O_4$ and YOF was presumably originated from O element in the aluminum nitride raw material. Y element in YOF was presumably originated mainly from yttrium oxide in the aluminum nitride sintered bodies.

Here, let us consider the photograph of the microstructure in experimental example 1 (FIG. 1). While a photograph of the microstructure of the aluminum nitride sintered bodies is not illustrated, the whole region was dark grey in color, and a large number of white spots were dispersed there. The dark gray region was identified as AlN. The white spots were identified as YAM ($Y_4Al_2O_3$). YAM was formed by the reaction of $Al_2O_3$, which is contained as an impurity in the aluminum nitride powder, and $Y_2O_3$ serving as the sintering aid in the production of the aluminum nitride sintered bodies. Each of the aluminum nitride sintered bodies in the aluminum nitride bonded body was divided into three layers (see FIG. 2). In a first layer closest to the bonding layer, the whole region was dark grey (AlN) in color, and black spots were dispersed there. The black spots were identified as pores. It was confirmed that $MgAl_2O_4$ was present in and near the pores. In a second layer adjacent to the first layer, the whole region was dark, grey in color, and white spots (YAM) were dispersed there. Furthermore, white streaks (presumably, portions where the liquid phase was spread) were observed. The first layer and the second layer are referred to as the reaction layers. A third layer adjacent to the second layer, not shown in FIG. 1, had the same state as before the bonding. The whole region was dark grey (AlN) in color, and a large number of white spots (YAM) were dispersed there. FIG. 2 is a schematic view of the microstructure in experimental example 1. In other experimental examples, the same microstructure as in experimental example 1 was observed.

A mechanism for the formation of the microstructure is speculated as follows: In the bonding material composition, a liquid phase mainly composed of $MgF_2$ is formed by heating. The liquid phase moves to the aluminum nitride sintered body and reacts with YAM of a grain boundary phase to form a new liquid phase (Y—Mg—Al—O—F). The newly formed liquid phase moves along grain boundaries of AlN and partially flows into the bonding material composition. The liquid phase that flowed into the bonding material composition functions as a sintering aid to permit AlN to be sintered at a low temperature. thereby promoting densification. Furthermore, in the case where the liquid phase mainly composed of $MgF_2$ reacts with YAM to form $MgAl_2O_4$ in addition to the liquid phase and where the reaction and the diffusion of the liquid phase are active, the pores (black spots) are presumably formed in places where YAM has been present, thereby forming the first layer. It is believed that the liquid phase is also diffused to a portion opposite the bonding layer to form the second layer. That is, the newly formed liquid phase (Y—Mg—Al—O—F) is an important component for the bonding. A comparison between experimental examples 1 and 3 in which the same bonding material composition was used reveals that the bonded body in experimental example 1 had higher strength. It was speculated that in experimental example 1, the bonding load was higher than that in experimental example 3, so the densification of the bending material and the reaction of the bonding material composition and the AlN base material were promoted, thereby increasing the bonding strength.

In each of experimental examples 6 to 9, a bonding material composition containing one of aluminum nitride raw materials No. 2 to 4 having different oxygen contents (oxygen content: 0.8% to 5.0% by mass) and the $MgF_2$ raw material in a mass ratio of 70:30 (in experimental example 8, a bonding material composition containing the AlN raw material that contains the $Al_2O_3$ raw material, and the $MgF_2$ raw material in a mass ratio of 70:30) was prepared. The aluminum nitride sintered bodies were bonded to each other with the bonding material composition. All the resulting aluminum nitride bended bodies had a high bonding strength of 200 MPa or more. No troublesome gas was generated. The aluminum nitride sintered bodies were not deformed before and after the bonding, and the original shape was maintained. The crystal phases of each of the bonding layers were AlN, $MgAl_2O_4$, and YOF. The same microstructure as in experimental example 1 was observed. The crystal phases of each of the reaction layers were AlN, $MgAl_2O_4$, and YOF. The characteristic evaluation of the bonded bodies in experimental examples 6 to 9 demonstrated that in experimental examples 8 and 9 whose $Al_2O_3$ contents (% by mass) were high in the converted amount of the bonding material composition, the bonding strength tended to be high.

In experimental example 10, the aluminum nitride sintered bodies were bonded as in experimental example 1, except that an $Yf_3$ raw material was used in place of the $MgF_2$ raw material. The resulting aluminum nitride bonded body had a high bonding strength of 340 MPa. No troublesome gas was generated. The aluminum nitride sintered bodies were not deformed before and after the bonding, and the original shape was maintained. The crystal phases of the bonding layer were AlN and YOF. It is speculated that in experimental example 10, the bonding load was as high as 40 kgf/cm², and the $Al_2O_3$ content was high in the converted amount of the bonding material composition similarly to experimental example 8 and 9, which provided satisfactory effects.

A photograph of a microstructure in experimental example 10 is illustrated in FIG. 3. Each of the aluminum nitride sintered bodies in experimental example 10 was divided into two layers. A first layer near the bonding layer was a reaction layer. The whole region was dark grey (AlN) in color, and white spots (YAM) were dispersed there. Furthermore, white streaks (presumably, portions where the liquid phase was spread) were observed. In a second layer adjacent to the first layer, as with before the bonding, the whole region was dark grey (AlN) in color, and a large number of white spots (YAM) were dispersed there. It was speculated that in experimental example 10, the phase containing the pores observed as the black spots in experimental example 1 (FIGS. 1 and 2) was not formed, thus providing the higher bonding strength.

A mechanism for the formation of the microstructure is speculated as follows: $YF_3$ in the bonding material composition reacted with $Al_2O_3$ present as an impurity in the AlN raw material in the bonding material composition to form a liquid phase (Y—Al—O—F). The resulting liquid phase was partially diffused into the aluminum nitride sintered body to form the first layer. The remaining liquid phase stayed in the bonding material composition and functioned as a sintering aid for AlN. As a result, AlN was seemingly sintered at a low temperature to promote densification. It was speculated that unlike experimental example 1, in experimental example 10, $MgF_2$ was not present in the bonding material composition, so the component in the bonding material composition did not significantly react with YAM in the AlN base material; hence, a phase where pores were present was not formed, thereby providing the high bonding strength.

In experimental example 11, an attempt was made to perform the bonding under the same conditions as in experimental example 3, except that the bonding temperature was reduced to 1200° C. However, the bonding was failed. The reason for this is that a sufficient liquid phase was not formed because of the low bonding temperature and thus the sintering of aluminum nitride in the bonding material composition was insufficient.

Experimental Examples 12 to 14

(Aluminum Nitride Sintered Body)
The same test pieces of the aluminum nitride sintered bodies as in experimental examples 1 to 11 were prepared.
(Bonding Material Composition)
Aluminum nitride raw material No. 1 (oxygen content: 4.8% by mass) described in Table 1, a commercially available magnesium fluoride raw material (purity: 99.9% or more), a commercially available yttria raw material (purity: 99.9% or more), and a commercially available alumina raw material (purity: 99.9% or more) were weighed in such a manner that values (% by mass) indicated, in the section "Amount of bonding material composition fed" of experimental examples 12 to 14 described in Table 4 were achieved. The weighed materials were mixed together using an alumina mortar to provide bonding material compositions (powder mixtures). Note that values of "Equivalent amount of bonding material composition (% by mass)" in Table 4 are values obtained by calculation when it is assumed that all O element in the aluminum nitride raw materials are present in the form of $Al_2O_3$.

In experimental examples 3, 6, 7, and 9 described above, the oxygen contents of the bonding material compositions were changed by changing the oxygen contents of the aluminum nitride raw materials. In contrast, in experimental examples 12 to 14, the aluminum nitride raw material had a constant oxygen content, and the oxygen contents of the bonding material compositions were changed by changing the amounts of the yttria raw material and the alumina raw material added.

TABLE 4

| | | Experimental example | | |
|---|---|---|---|---|
| | | 12 | 13 | 14 |
| Amount of bonding material composition fed (% by mass) | AlN raw material (No. 1) | 70 | 70 | 70 |
| | $MgF_2$ raw material | 19 | 24.5 | 21 |
| | $Y_2O_3$ raw material | 9 | 4.5 | 9 |
| | $YF_3$ raw material | 0 | 0 | 0 |
| | $Al_2O_3$ raw material | 2 | 1 | 0 |
| Equivalent Amount of bonding material composition (% by mass) | Amount of AlN | 62.9 | 62.9 | 62.9 |
| | Amount of $MgF_2$ | 19.0 | 24.5 | 21.0 |
| | Amount of $Y_2O_3$ | 9.0 | 4.5 | 9.0 |
| | Amount of $Al_2O_3$ | 9.1 | 8.1 | 7.1 |
| | Amount of $Y_2O_3$ with respect to amount of $Al_2O_3$ | 98.5 | 55.3 | 126.1 |
| Bonding condition | Temperature(° C.) | 1400 | 1400 | 1400 |
| | Bonding load (kgf/cm²) | 20 | 20 | 20 |
| Bonding layer | Strength(MPa) | 310 | 290 | 250 |
| | Crystal phase | AlN $MgAl_2O_4$ YOF | AlN $MgAl_2O_4$ YOF | AlN $MgAl_2O_4$ YOF |
| Reaction layer | Crystal phase | AlN $MgAl_2O_4$ YOF | AlN $MgAl_2O_4$ YOF | AlN $MgAl_2O_4$ YOF |

(Bonding Material Paste)
Bonding material pastes were prepared as in experimental examples 1 to 11.
(Bonding)
Aluminum nitride bonded bodies were produced as in experimental examples 1 to 11. The bonding load was 20 kgf/cm².
(Evaluation Item and Evaluation Result)
As with experimental examples 1 to 11, the bonding strength, the microstructures, and the crystal phases of the bonding layers of the resulting aluminum nitride bonded bodies were evaluated. All the resulting aluminum nitride bonded bodies had a high bonding strength of 250 MPa or more. No troublesome gas was generated. The aluminum nitride sintered bodies were not deformed before and after the bonding, and the original shape was maintained. Observation of the microstructure of the bonded bodies presumably revealed that the amounts of the pores in the reaction layers were reduced, thus providing the high-strength aluminum nitride bonded bodies. The crystal phases of each of the bonding layers were AlN, $MgAl_2O_4$, and YOF. The crystal phases of each of the reaction layers were AlN, $MgAl_2O_4$, and YOF. From the consideration of the relationship between the bonding material expositions in the experimental examples 12 to 14 and the bonding strength, regarding "the amount of $Y_2O_3$ with respect to the amount of $Al_2O_3$" in the converted amount of the bonding material composition, the bonding strength was maximized in the vicinity of the value of 98.5% by mass in experimental example 12 (see FIG. 4).

The foregoing results demonstrated that the oxygen contents of the bonding material compositions may be adjusted by adjusting the oxygen contents of the aluminum nitride raw materials, as described in experimental examples 3, 6, 7, and 9 and that the oxygen contents of the bonding material compositions may be adjusted by adjusting the amounts of the oxides added separately from the aluminum nitride raw material, as described in experimental examples 12 to 14.

Experimental Examples 15 to 22

In experimental examples 15 to 22, the same test pieces of the aluminum nitride sintered bodies as in experimental example 1 were prepared. Aluminum nitride bonded bodies were produced at the amounts of the bonding material compositions fed and the converted amounts of the bonding material compositions and under the bonding conditions described in Table 5, and the characteristics were evaluated. Table 5 also describes the bonding strength in the experimental examples. AlN raw material No. 5 used in experimental examples 15, 16, and 18 to 21 was obtained by pulverizing AlN raw material No. 2 with a ball mill, and had an oxygen content of 2.94% by mass and a particle diameter of 0.8 μm (the oxygen content was low because the particle diameter was larger than that of AlN raw material No. 3). In each of experimental examples 15 to 22, each of the resulting bonded bodies was tightly bonded by holding the bonded sample at 1260° C. for 30 minutes and then increasing the temperature to 1430° C., which was the bonding temperature, and holding the temperature for a predetermined time. The crystal phases of the bonding layers and the reaction layers in the bonded bodies were all the same as in experimental example 12, not described in Table 5.

and the AlN sintered bodies proceeded, thereby providing the high-strength bonded bodies.

Figure 4:
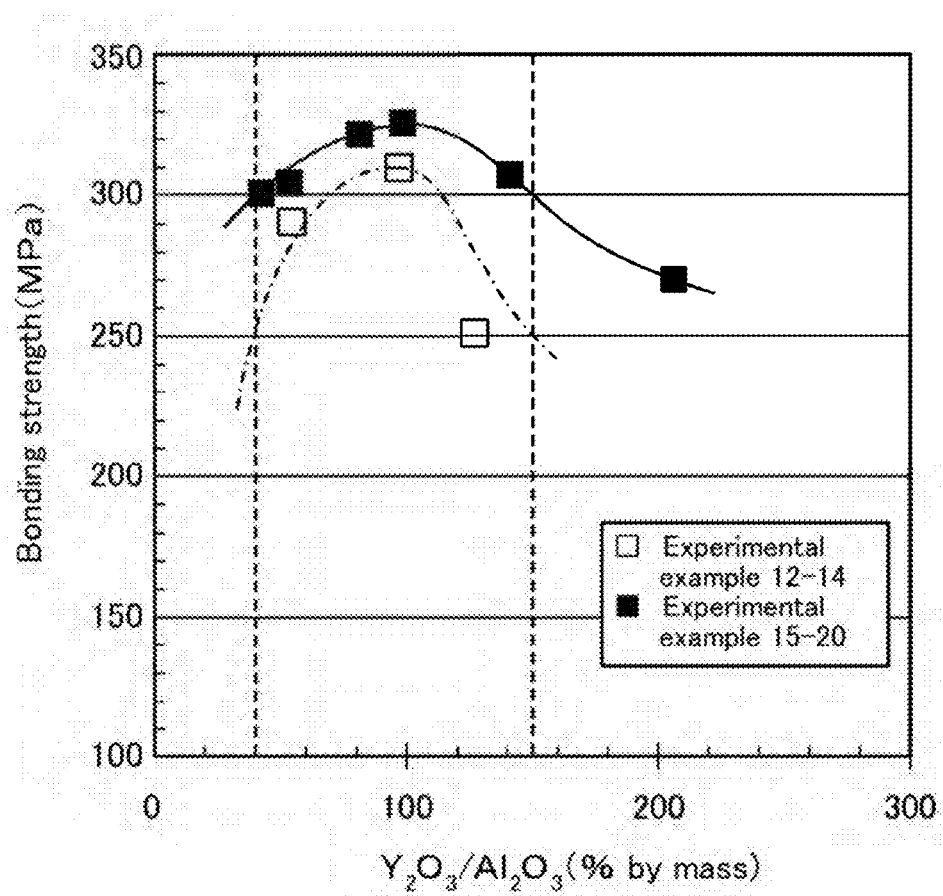
FIG. 4 is a graph illustrating the relationship between the bonding strength and the ratio of the amount of $Y_2O_3$ (% by mass) with respect to the amount of $Al_2O_3$ in the converted amount of a bonding material composition.

FIG. 4 is a plot of the relationship between the bonding strength and the "amount of $Y_2O_3$ with respect to the amount of $Al_2O_3$" (hereinafter, referred to as $Y_2O_3/Al_2O_3$) in the converted amount of the bonding material composition in experimental examples 12 to 20. In FIG. 4, a group of experimental examples 12 to 14 and a group of experimental examples 15 to 20 are separately plotted. Experimental examples 12 to 14 belonged to the same group because the common bonding conditions, i.e., a bonding temperature of 1400° C., a holding time of 2 hours, and a bonding load of 20 kg/cm², were employed. Experimental examples 15 to 20 belonged to the same group because the common bonding conditions, i.e., a bonding temperature of 1430° C., a holding time of 10 hours, and a bonding load of 20 kg/cm². From FIG. 4, in experimental examples 12 to 14, when $Y_2O_3/Al_2O_3$=40 to 150 (% by mass), the high-strength bonded bodies having a bonding strength of 250 MPa or more were produced. In experimental examples 15 to 20,

TABLE 5

| | | Experimental example | | | | | | | |
|---|---|---|---|---|---|---|---|---|---|
| | | 15 | 16 | 17 | 18 | 19 | 20 | 21 | 22 |
| Amount of bonding material composition fed (% by mass) | AlN raw material (No. | 68.9 5 | 72 5 | 70 1 | 70 5 | 72 5 | 71.4 5 | 67.2 5 | 70 1) |
| | $MgF_2$ raw material | 22.5 | 20.0 | 19.0 | 19.0 | 24.1 | 19.4 | 19.0 | 21.0 |
| | $Y_2O_3$ raw material | 4.5 | 5.6 | 9.0 | 9.0 | 2.5 | 9.2 | 9.0 | 9.0 |
| | $Al_2O_3$ raw material | 4.1 | 2.4 | 2.0 | 2.0 | 1.4 | 0.0 | 4.8 | 0.0 |
| Equivalent Amount of bonding material composition (% by mass) | Amount of AlN | 64.6 | 67.5 | 62.9 | 65.6 | 67.5 | 66.9 | 63.0 | 62.9 |
| | Amount of $MgF_2$ | 22.5 | 20.0 | 19.0 | 19.0 | 24.1 | 19.4 | 19.0 | 21.0 |
| | Amount of $Y_2O_3$ | 4.5 | 5.6 | 9.0 | 9.0 | 2.5 | 9.2 | 9.0 | 9.0 |
| | Amount of $Al_2O_3$ | 8.4 | 6.9 | 9.1 | 6.4 | 5.9 | 4.5 | 9.0 | 7.1 |
| | Amount of $Y_2O_3$ with respect to amount of $Al_2O_3$ | 53.6 | 81.2 | 98.5 | 141.3 | 42.4 | 206.3 | 100.0 | 126.1 |
| Bonding condition | Temperature(° C.) | 1430 | 1430 | 1430 | 1430 | 1430 | 1430 | 1430 | 1430 |
| | Bonding time (hr) | 10 | 10 | 10 | 10 | 10 | 10 | 2 | 2 |
| | Bonding load (kgf/cm²) | 20 | 20 | 20 | 20 | 20 | 20 | 60 | 60 |
| Reaction layer | Strength (MPa) | 304 | 322 | 326 | 307 | 301 | 270 | 328 | 326 |

In experimental examples 15 to 20, while the bonding load was 20 kgf/cm², which was equal to that in experimental examples 12 to 14, the bonding temperature was 1430° C., which was higher than that in experimental examples 12 to 14, and the holding time was 10 hours, which was longer than that in experimental examples 12 to 14. The strength of the resulting bonded bodies was 270 to 326 MPa, which was generally higher than that in experimental examples 12 to 14 (250 to 310 MPa). It was speculated that in experimental examples 15 to 20, the increases in bonding temperature and holding time permitted the reaction in the bonding material composition and the reaction of the bonding material composition and the AlN sintered bodies to proceed sufficiently, thereby providing the high-strength bonded bodies.

In experimental examples 21 and 22, while the bonding load was increased to 60 kgf/cm², the holding time was reduced to 2 hours. The resulting bonded bodies had a bonding strength of 328 and 326 MPa. The highest strength was stably obtained. In experimental examples 21 and 22, the bonding load was high, and the holding time was short, compared with experimental examples 15 to 20. It was thus speculated that the reaction in the bonding material composition and the reaction of the bonding material composition when $Y_2O_3/Al_2O_3$=40 to 150 (% by mass), the higher-strength bonded bodies having a bonding strength of 300 MPa or more were produced. The results demonstrated that regardless of the bonding conditions, the high-strength bonded bodies were produced when $Y_2O_3/Al_2O_3$ =40 to 150 (% by mass).

A mechanism for the bonding is speculated as follows: In experimental examples 12 to 22, the components as the bonding materials sandwiched between the aluminum nitride sintered bodies are AlN, $MgF_2$, $Y_2O_3$ and $Al_2O_3$. Of these, AlN is a component that stays mainly in the bonding layer and functions as a framework material for the bonding layer. As with experimental examples 1 to 11 described above, $MgF_2$, $Y_2O_3$, and $Al_2O_3$ (including $Al_2O_3$ originating from the oxygen component in the AlN powder) form a liquid phase by heating. The liquid phase permits the AlN component introduced as a framework material to be sintered, thereby resulting in the densification of the bonding layer. The liquid phase partially reacts with the AlN base material and diffuses into the base material, thereby establishing the bonding at the interfaces. The bonding with the bonding material composition is seemingly achieved by the reactions and diffusion. In this case, the fluorides, such as MgF$_2$ and YF$_3$, have relatively low melting points of about 1248° C. and about 1152° C. and, presumably, are sufficiently liquefied to form the liquid phase before the bonding temperature reaches the maximum temperature. Furthermore, the liquid phase component will sufficiently react with another component in the bonding material composition. An important point to allow at least part of another component in the bonding material composition to dissolve in the liquid phase is seemingly the ratio of the rare-earth metal oxide to the Al$_2$O$_3$ component.

Experimental Examples 23 to 25

Experimental examples 23 to 25 were examples performed by changing the conditions of the AlN sintered bodies. The AlN sintered bodies were produced as in experimental example 1, unless otherwise specified. In experimental examples 23 and 24, the amounts of yttrium oxide added as a sintering aid were 0.1 parts by mass and 0.5 parts by mass, respectively. The AlN sintered bodies were produced at a firing temperature of 1900° C. The AlN sintered bodies were processed into test pieces as in experimental example 1. AlN bonded bodies were produced at the same amounts of the bonding material composition fed and the same bonding conditions as in experimental example 21. The bonding strength was evaluated. A bonding strength of 305 MPa was obtained in experimental example 23, and a bonding strength of 317 MPa was obtained in experimental example 24. Both AlN bonded bodies had sufficiently high bonding strength. In experimental example 25, ytterbium oxide was used as a sintering aid. The amount of ytterbium oxide added was 5 parts by weight. AlN sintered bodies were produced, and test pieces were prepared. A bonded body was produced under the same conditions as in experimental example 21. The bonded body had a high bonding strength of 330 MPa.

These results demonstrated that even in the case where the AlN sintered bodies had different contents of the rare-earth metal oxide as described in experimental examples 23 and 24 or where the rare-earth metal oxide used as a sintering aid for AlN was different from the rare-earth metal oxide used for the bonding material as described in experimental example 25, the bonding material composition and the method for producing the holding material composition according to the present invention were advantageously affected.

Experimental Example 26

Experimental example 26 was an example performed by changing the conditions of the AlN sintered bodies. The AlN sintered bodies did not contain a rare-earth metal oxide serving as a sintering aid and were produced as described below.

To 100 parts by mass of a commercially available aluminum nitride powder having a purity of 99% or more (excluding the oxygen content), 1 part by mass of a commercially available magnesium oxide powder (purity: 99.95% or more, average particle diameter: 1 μm) was added. The mixture was wet-mixed for 4 hours in isopropyl alcohol serving as a solvent using a ball mill. The resulting slurry was taken out and dried under a flow of nitrogen to provide a powder mixture of aluminum nitride and magnesium oxide. The powder mixture was formed into plate-like compacts each having a diameter of about 50 mm and a thickness of about 25 mm by metal molding. The resulting compacts were placed in a graphite mold and fired by hot pressing at 1800° C. for 4 hours in nitrogen gas while a pressure of 20 MPa was applied, thereby producing dense aluminum nitride sintered bodies. Test pieces, having a size of 50 mm in diameter×10 mm in thickness, of the aluminum nitride sintered bodies were cut out from the resulting aluminum nitride sintered bodies and used as aluminum nitride sintered bodies for bonding. The bonding surfaces ware finished to have a surface roughness (Ra) of 1 μm or less.

An AlN bonded body was produced with the resulting aluminum nitride sintered bodies free from a rare-earth metal oxide at the same amount of the bonding material composition fed and the same bonding conditions as in experimental example 21. The bonding strength was evaluated in the same way as in experimental example 21. The bonding strength of the resulting bonded body was as high as 260 MPa. The results demonstrated that the bonding material composition and the method for producing the bonding material composition according to the present invention were sufficiently employed for the bonding of the aluminum nitride sintered bodies free from a rare-earth metal oxide.

The bonding material compositions in experimental examples 1 to 26 correspond to the bonding material compositions according to the present invention. The aluminum nitride bonded bodies and the methods for producing the aluminum nitride bonded bodies in experimental examples 1 to 10 and 12 to 26 correspond to the aluminum nitride bonded bodies and the methods for producing the aluminum nitride bonded bodies. The present invention is not limited to the foregoing embodiments. It is needless to say that various aspects may be performed without departing from the technical scope of the present invention.

The present application claims priority from Japanese Patent Application No. 2013-272347 filed on Dec. 27, 2013, Japanese Patent Application No. 2014-188416 filed on Sep. 17, 2014 and Japanese Patent Application No. 2014-191258 filed on Sep. 19, 2014, the entire contents of which are incorporated herein by reference.

What is claimed is:

1. A bonding material composition used when aluminum nitride sintered bodies containing a rare-earth metal oxide are bonded to each other,
wherein the bonding material composition contains in addition to an O element-containing aluminum nitride raw material, (a) as a fluorine compound, at least one of a fluorine compound of an alkaline-earth metal and a fluorine compound of a rare-earth metal, or (b) as a fluorine compound,, at least one of a fluorine compound of an alkaline-earth metal and a fluorine compound of a rare-earth metal, and a rare-earth metal oxide.

2. The bonding material composition according to claim 1, wherein the content of O element in the aluminum nitride raw material is 0.4% to 30% by mass.

3. The bonding material composition according to claim 1, containing an amount of 20% to 85% by mass of aluminum nitride (excluding the oxygen content in terms of Al$_2$O$_3$) and an amount of 10% to 50% by mass of the fluorine compound.

4. The bonding material composition according claim 1, having an aluminum oxide content of 0.4% to 60% by mass, including a value obtained by calculating the content of O element in the aluminum nitride raw material in terms of Al$_2$O$_3$.

5. The bonding material composition according to claim 4, containing a rare-earth metal oxide in an amount of 40% to 150% by mass with respect to $Al_2O_3$ content (including a value obtained by calculating O element in the aluminum nitride raw material in terms of $Al_2O_3$).

6. A method for producing an aluminum nitride bonded body in which the aluminum nitride sintered bodies are bonded to each other, including;
sandwiching the bonding material composition according to claim 1 between aluminum nitride sintered bodies and heating the resulting assembly at 1450° C. or lower with a bonding load applied.

7. A bonding material composition used when an aluminum nitride sintered body free from a rare-earth metal oxide is bonded to an aluminum nitride sintered body that contains or does not contain a rare-earth metal oxide,
wherein the bonding material composition contains in addition to an O element-containing aluminum nitride raw material, (a) at least one of a fluorine compound of an alkaline-earth metal and a fluorine compound of a rare-earth metal, and a rare-earth metal oxide, (b) a fluorine compound of a rare-earth metal, or (c) a fluorine compound of an alkaline-earth metal and a fluorine compound of a rare-earth metal.

8. The bonding material composition, according to claim 7, wherein the content of O element in the aluminum nitride raw material is 0.4% to 30% by mass.

9. The bonding material composition according to claim 7, containing an amount of 20% to 85% by mass of aluminum nitride (excluding the oxygen content in terms of $Al_2O_3$) and an amount of 10% to 50% by mass of the fluorine compound.

10. The bonding material composition according claim 7, having an aluminum oxide content of 0.4% to 60% by mass, including a value obtained by calculating the content of O element in the aluminum nitride raw material in terms of $Al_2O_3$.

11. The bonding material composition according to claim 10, containing a rare-earth metal oxide in an amount of 40% to 150% by mass with respect to $Al_2O_3$ content (including a value obtained by calculating O element in the aluminum nitride raw material in terms of $Al_2O_3$).

12. A method for producing an aluminum nitride bonded body in which the aluminum nitride sintered bodies are bonded to each other, including:
sandwiching the bonding material composition according to claim 7 between aluminum nitride sintered bodies and heating the resulting assembly at 1450° C. or lower with a bonding load applied.

* * * * *